United States Patent [19]
Cherabuddi

[11] Patent Number: 5,860,117
[45] Date of Patent: Jan. 12, 1999

[54] APPARATUS AND METHOD TO IMPROVE PRIMARY MEMORY LATENCIES USING AN EVICTION BUFFER TO STORE WRITE REQUESTS

[75] Inventor: Rajasekhar Cherabuddi, Sunnyvale, Calif.

[73] Assignee: Sun Microsystems, Inc., Mountain View, Calif.

[21] Appl. No.: 657,808

[22] Filed: May 31, 1996

[51] Int. Cl.[6] ...................................................... G06F 12/08
[52] U.S. Cl. .......................... 711/151; 395/859; 395/860; 711/117; 711/158
[58] Field of Search ..................................... 711/118, 117, 711/122, 158, 169, 151; 395/859, 872, 860, 732

[56] References Cited

U.S. PATENT DOCUMENTS

| | | | |
|---|---|---|---|
| 5,404,483 | 4/1995 | Stamm et al. | 711/144 |
| 5,434,993 | 7/1995 | Liencres et al. | 711/133 |
| 5,553,270 | 9/1996 | Rosenbluth | 711/169 |
| 5,566,317 | 10/1996 | Treiber et al. | 711/117 |
| 5,649,157 | 7/1997 | Williams | 711/151 |

*Primary Examiner*—Eddie P. Chan
*Assistant Examiner*—Hiep T. Nguyen
*Attorney, Agent, or Firm*—Flehr Hohbach Test Albritton & Herbert LLP; William S. Galliani

[57] ABSTRACT

A central processing unit of a computer includes an external cache controller and a primary memory controller. The external cache controller generates a primary memory read request and a primary memory write request in response to an external cache miss. The primary memory controller includes an address queue, an eviction buffer, and an eviction buffer logic circuit. The eviction buffer logic circuit selectively stores the primary memory write request in the eviction buffer and stores the primary memory read request in the address queue. When subsequent primary memory read requests are received at the primary memory controller, the eviction buffer logic circuit routes them to the address queue. The primary memory write request in the eviction buffer is passed to the address queue when the eviction buffer logic circuit identifies an empty queue, meaning there are no pending primary memory write requests. The data in the eviction buffer is also sent to the address queue when a new primary memory write request is received at the eviction buffer logic circuit.

12 Claims, 8 Drawing Sheets

| Address | Required Action by MCU | Buffer Value | Queue Action | Final Queue State |
|---|---|---|---|---|
| X1 | 0 | 0 | 0 | 0 |
| X2 | RX2, WX8 | WX8 | Execute RX2 | 0 |
| X3 | RX3, WX10 | WX10 | Execute RX3 | WX8 |
| X4 | RX4 | WX10 | Execute RX4 | WX8 |
| X12 | RX12 | WX10 | Execute RX12 | WX8 |
|  |  | 0 | Execute WX8 | WX10 |
|  |  | 0 | Execute WX10 | 0 |

APPARATUS AND METHOD TO IMPROVE PRIMARY MEMORY LATENCIES USING AN EVICTION BUFFER TO STORE WRITE REQUESTS

BRIEF DESCRIPTION OF THE INVENTION

This invention relates generally to techniques by which a Central Processing Unit (CPU) of a computer accesses primary memory. More particularly, this invention relates to a technique of improving the latency to primary memory by using an eviction buffer to store a write request to primary memory while read requests to primary memory are executed.

BACKGROUND OF THE INVENTION

Figure 1:
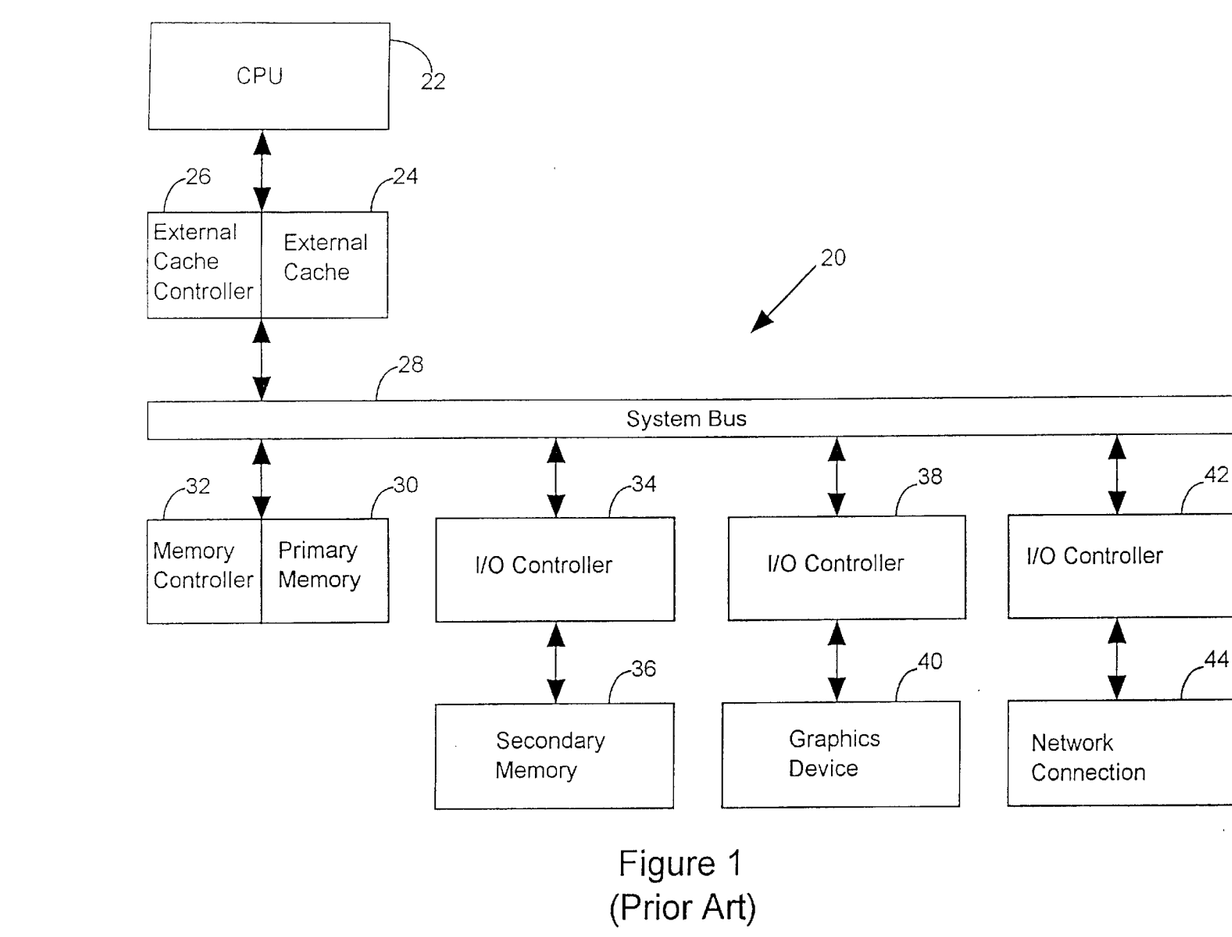
FIG. 1 illustrates a general purpose computer in accordance with the prior art.

FIG. 1 is an illustration of a general purpose computer 20. The computer 20 includes a central processing unit (CPU) 22. The CPU 22 executes instructions of a computer program. Each instruction is located at a memory address. Similarly, the data associated with an instruction is located at a memory address. The CPU 22 accesses a specified memory address to fetch the instruction or data stored there.

Most CPUs include an on-board memory called an internal cache. If a specified address is not in the internal, or L1, cache, then the CPU 22 looks for the specified address in an external cache, also called an L2 cache 24. The external cache 24 has an associated external cache controller 26.

If the address is not in the external cache 24 (a cache miss), then the external cache 24 requests access to a system bus 28. When the system bus 28 becomes available, the external cache 24 is allowed to route its address request to the primary memory 30. The primary memory 30 has an associated memory controller 32.

Figure 2:
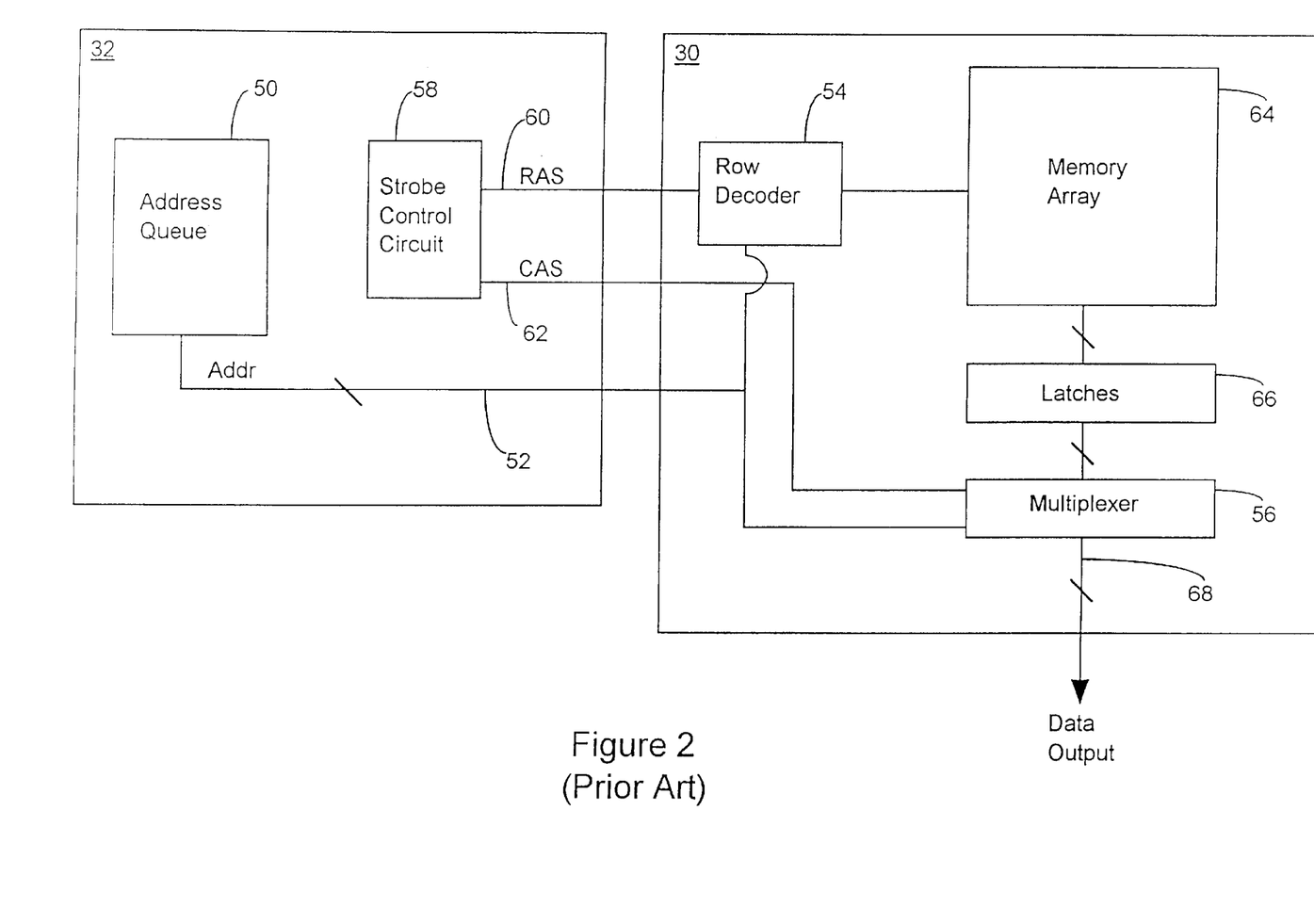
FIG. 2 illustrates a primary memory controller and primary memory in accordance with the prior art.

FIG. 2 illustrates a primary memory controller 32 and its associated primary memory 30. The memory controller 32 includes an address queue 50 to store address requests received from the system bus 28. An address from the queue 50 is applied to the bus 52, which routes the address to a row decoder 54 and a multiplexer 56. A strobe control circuit 58 is used to enable either the row decoder 54 or the multiplexer 56. In particular, the row decoder 54 generates a Row Access Strobe (RAS) signal on line 60 or a Column Access Strobe (CAS) signal on line 62.

When an address and the RAS signal are applied to the row decoder 54, the row decoder 54 specifies a row of values in a memory array 64. The row of values, also called a memory page, is then passed into a set of latches 66. Selected columns from the row (or page) of data are then specified with the address signal. That is, a subsequent address signal is used to specify selected columns in the row. The subsequent address signal is used as a multiplexer select signal, enabled by the CAS signal. Thereafter, the multiplexer 56 generates a data output signal on an output bus 68.

Figure 3:
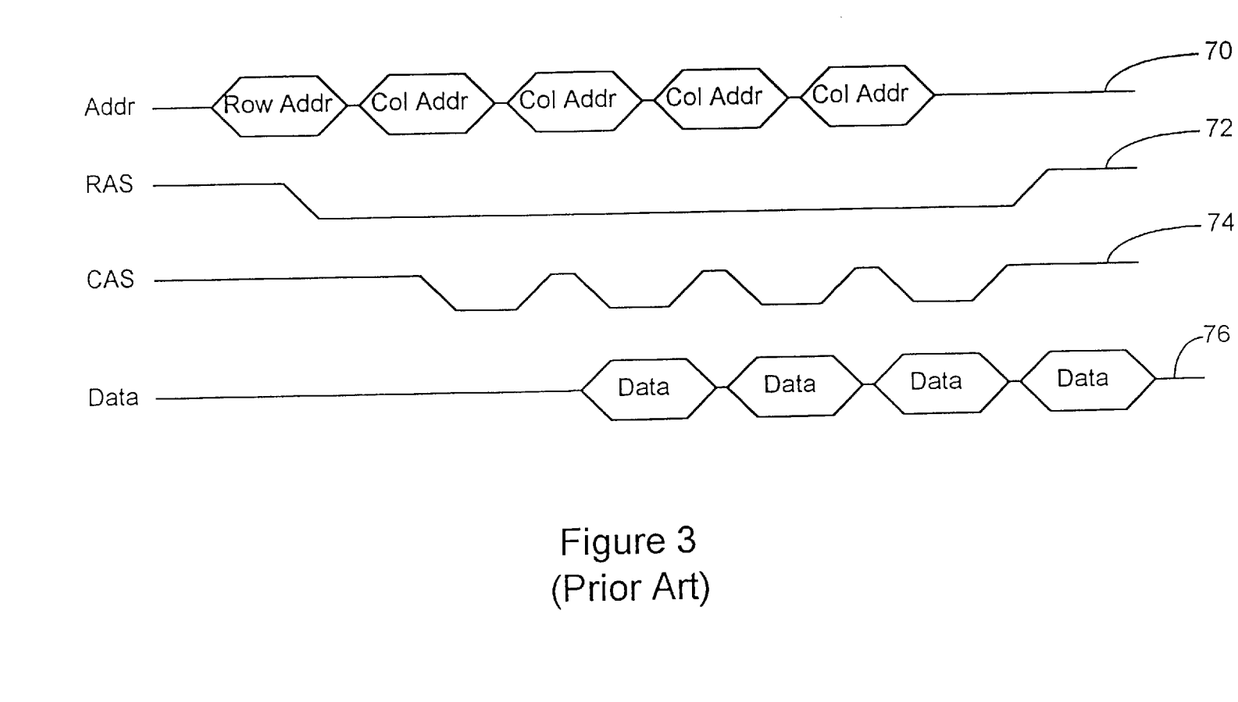
FIG. 3 is a set of waveforms illustrating the operation of the circuit of FIG. 2.

The foregoing operation is more fully appreciated with reference to FIG. 3. Waveform 70 illustrates a row address being asserted, followed by a set of column addresses. These signals are applied to the bus 52 of FIG. 2. The same bus 52 is used for both the row and column address in order to save package pins and thereby reduce package costs. The row address (Row Addr) is routed to the row decoder 54 as the RAS signal is deasserted, as shown with the waveform 72 going from high to low. The combination of the row address and the deasserted RAS signal allows the row decoder 54 to access a row in the memory array 64, resulting in the row being driven into the latches 66.

Note that the RAS signal is deasserted after the row address is launched. This time delay is for the purpose of allowing the row address to reach the row decoder. Thus, it can be appreciated with reference to FIG. 3 that there is a delay involved with launching a row address and with deasserting the RAS signal. Thus, it is desirable to reduce the frequency of this operation.

After a row of values is driven into the latches 66, a first set of data is read from the latches 66 with the multiplexer 56, as a first column address and a deasserted CAS signal is received at the multiplexer 56. The first deassertion of the CAS signal is shown with the waveform 74. The first deassertion of the CAS signal coincides with the timing of the first column address, as shown in FIG. 3. This operation results in a first set of output data being driven onto the bus 68. The first set of output data is shown with the waveform 76. The RAS signal continues to be deasserted, shown with the waveform 72, as the subsequent column address signals, shown with the waveform 70, are applied to the multiplexer 56. The subsequent column address signals are timed to coincide with the deassertion of the CAS signal, as shown with the waveform 74. This operation produces three subsequent sets of data. Depending upon the system, the data of the waveform 76 may not be returned until after the second, third, or fourth column address is asserted. A relatively quick return of data is illustrated for convenience.

Note that after the last column address is sent, the RAS signal is asserted (goes high) once again. If a new address is to be fetched from primary memory, the RAS signal must be deasserted again, and the foregoing processing must be repeated.

In FIG. 3, the four blocks of data that are retrieved can be thought of as a single memory word. Sometimes a number of memory words can be retrieved using the same row address. That is, when a subsequent address request refers to the same memory page (or row address), a new set of column addresses can be sent while keeping the same row address asserted. This operation, sometimes referred to as page-mode addressing, results in substantial memory latency improvements because delays associated with the row address signal and the RAS signal are avoided.

Page-mode addressing is frequently available when reading data from a primary memory. In other words, it is commonly necessary to read memory addresses that are located at adjacent positions in memory. This allows for a single row address to be asserted while multiple memory words are retrieved. On the other hand, primary memory write requests tend to be random in nature. In other words, a write back (or copy back) to memory is rarely to the same page as a previous accessed address. As a consequence, primary memory write accesses typically necessitate the assertion of a new row address.

Thus, primary memory latencies can be improved if primary memory write requests minimally interpose primary memory read requests. In such a case, primary memory read requests can enjoy more page-mode access optimizations.

Returning now to FIG. 1, the data output from the primary memory 30 is applied to the system bus 28. It is then stored in the external cache 24 and is passed to the CPU 22 for processing. The processing described in reference to FIGS. 1–3 must be performed for every address request. Indeed, if the address request is not found in the primary memory 30, similar processing is performed by an input/output controller 34 associated with a secondary memory 36.

Figure 4:
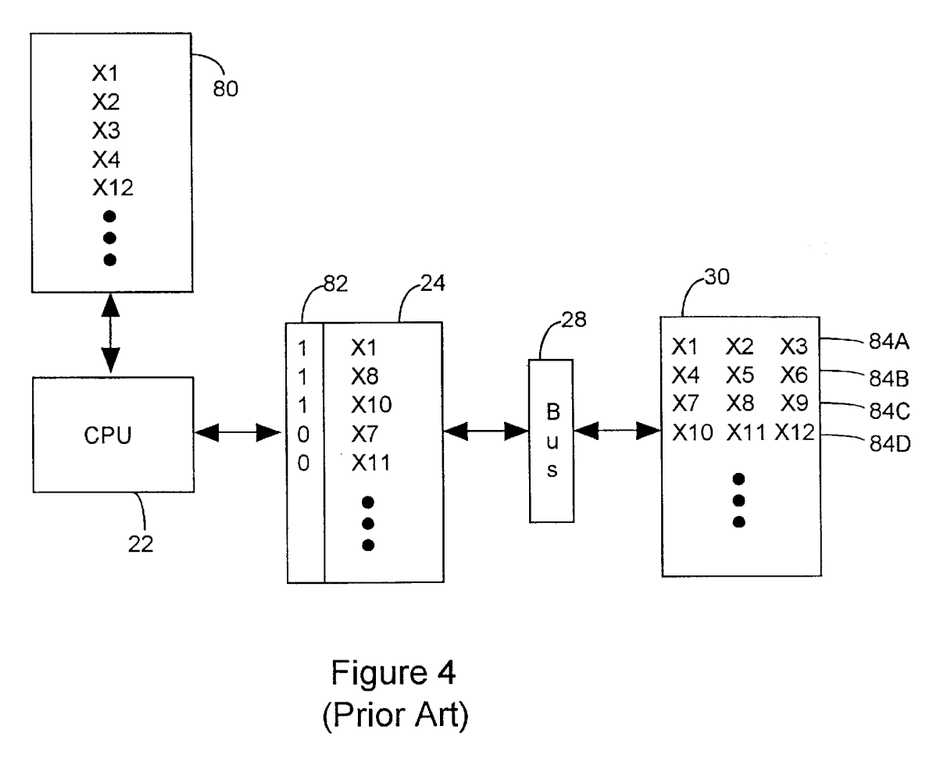
FIG. 4 illustrates the prior art processing of a sequence of address requests of a computer program.

FIG. 4 illustrates an example of the processing of a set of program addresses by the apparatus described in FIGS. 1 and 2. In FIG. 4, the CPU 22 processes a computer program 80, which includes address requests X1, X2, X3, X4, X12, etc. FIG. 4 also illustrates an external cache 24 with a set of stored addresses X1, X8, X10, X7, and X11. Each stored address has an associated "dirty bit", collectively shown as a column 82. If the dirty bit is set (a digital one value), it means that the data for the associated address has changed while it was in the external cache 24. As a consequence, when the data is removed from the external cache, the updated value must be written back (or copied back) to primary memory 30. On the other hand, if the dirty bit is not set, then a value can simply be deleted from external cache, because the primary memory already stores the same value. The significance of this factor is discussed below.

FIG. 4 also illustrates that the system bus 28 is connected between the external cache 24 and the primary memory 30. The external cache controller 26 and the primary memory controller 30 are not illustrated in FIG. 4 for the purpose of simplicity, but it is understood that they exist. The primary memory 30 includes a set of primary memory pages (or rows) 84A, 84B, 84C, and 84D. Each row includes three memory words. For example, memory page (or row) 84A includes memory words X1, X2, and X3.

Figure 5:
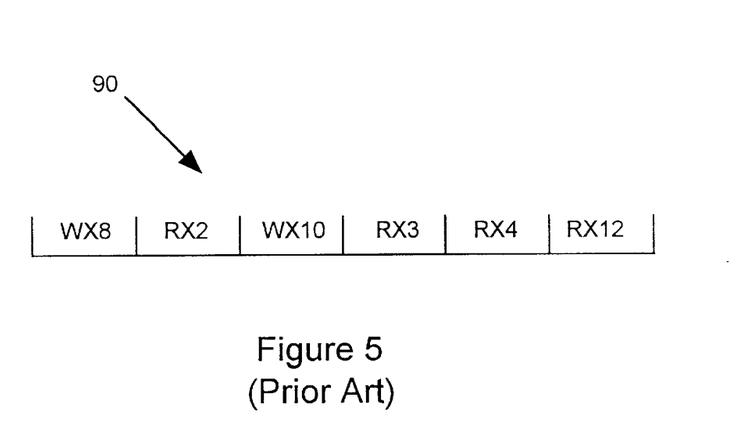
FIG. 5 illustrates the sequence of processing performed at the memory control unit when the address requests of FIG. 4 are processed.

FIG. 5 illustrates the traffic that is processed by a primary memory controller 32 of the primary memory 30 when processing the computer program 80 of FIG. 4. The address X1 is the first address request of the computer program 80. As shown in FIG. 4, the address X1 exists in the external cache 24. Thus, the CPU 22 retrieves the data associated with the address and processes it. The next address request in the computer program 80 is the value X2. As shown in FIG. 4, the value X2 does not exist in the external cache 24. Thus, it must be retrieved from primary memory 30. The external cache controller decides that the value X2 should be placed in the external cache 24 at the location currently held by the value X8. Since the value X8 has been changed, as indicated by the dirty bit value set to a digital one, the value X8 must be written back to primary memory. Thus, the external cache controller 26 generates a primary memory write request to the address X8 and a primary memory read request for the address X2. FIG. 5 illustrates that the primary memory controller 32 receives the primary memory write request (WX8) followed by the primary memory read request (RX2). In accordance with the prior art, these values are processed sequentially.

The next address request in the program 80 is the value X3. The value X3 is not in the external cache 24. Since the dirty bit associated with the value X10 has been set, the value X10 has to be written back to primary memory 30. Thus, a write request (WX10) and a read request (RX3) are passed to primary memory, as shown in FIG. 5.

The next address request in the program 80 is the value X4. Since the value X4 does not exist in the external cache 24, the external cache controller generates a read request (RX4) to primary memory. The read request is for the purpose of loading the data for the address X4 into the external cache 24. The data can be loaded in the external cache 24 at the location X7, since the X7 dirty bit has a digital low value.

The final address to be processed is X12. Once again, the value does not exist in the external cache 24, therefore it must be read (RX12) from primary memory 30. Since the value X11 in primary memory has not changed (its dirty bit is set to a digital zero), a write request does not have to accompany the read request RX12.

Returning to FIG. 5, it can be seen that the primary memory controller processes read and write requests in the order that it receives them. It can also be observed that the write request WX10 interposes read requests. Read requests are more critical to primary memory latencies than write requests. Thus, it would be desirable to execute primary memory read requests before primary memory write requests. It would also be desirable to group primary memory read requests for the purpose of achieving primary memory page-mode optimizations.

Returning now to FIG. 1, depicted therein are additional devices connected to the system bus 28. For example, FIG. 1 illustrates an input/output controller 38 operating as an interface between a graphics device 40 and the system bus 28. In addition, the figure illustrates an input/output controller 42 operating as an interface between a network connection circuit 44 and the system bus 28.

The multiple connections to the system bus 28 result in a relatively large amount of traffic. Consequently, there are delays associated with passing information on the system bus 28. System bus 28 delays discourage optimizations of the memory controller 32 that require the passing of information to the CPU 22. Optimization of the memory controller 32 that require the passing of information to the CPU 22 are also discouraged since they typically involve additional signal lines. It is important to reduce the number of pins associated with a CPU package, thus using additional signal lines for memory controller optimizations is not a practical option.

Despite the obstacles preventing improvements to primary memory controllers, it is important to realize improvements in primary memory access times. Primary memory latencies are not improving as much as CPU speeds. Thus, primary memory latencies are increasingly reducing the execution performance of CPUs.

In view of the foregoing, it would be highly desirable to improve the performance of a primary memory controller. In particular, it would be highly desirable to improve the latency associated with primary memory read requests. It would be desirable to achieve this improvement through prioritized primary memory read requests and optimized primary memory page-mode accesses. The performance improvements should not involve additional traffic on the system bus 28, nor should they require additional signal lines into the CPU 22.

SUMMARY OF THE INVENTION

A central processing unit of a computer includes an external cache controller and a primary memory controller. The external cache controller generates a primary memory read request and a primary memory write request in response to an external cache miss. The primary memory controller includes an address queue, an eviction buffer, and an eviction buffer logic circuit. The eviction buffer logic circuit selectively stores the primary memory write request in the eviction buffer and stores the primary memory read request in the address queue. When subsequent primary memory read requests are received at the primary memory controller, the eviction buffer logic circuit routes them to the address queue. The primary memory write request in the eviction buffer is passed to the address queue when the eviction buffer logic circuit identifies an empty queue, meaning there are no pending primary memory write requests. The data in the eviction buffer is also sent to the address queue when a new primary memory write request is received at the eviction buffer logic circuit.

Thus, the primary memory controller of the invention re-orders primary memory read requests so that they are executed before primary memory write requests. As a result, primary memory read request latencies are reduced. By reducing such latencies, the invention achieves improved program execution. By executing primary memory read requests in succession, without intervening primary memory write requests, there is a greater likelihood of page-mode optimizations. This factor also reduces primary memory read request latencies. The invention achieves these benefits without adding traffic to the system bus and without requiring additional package pins.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 6:
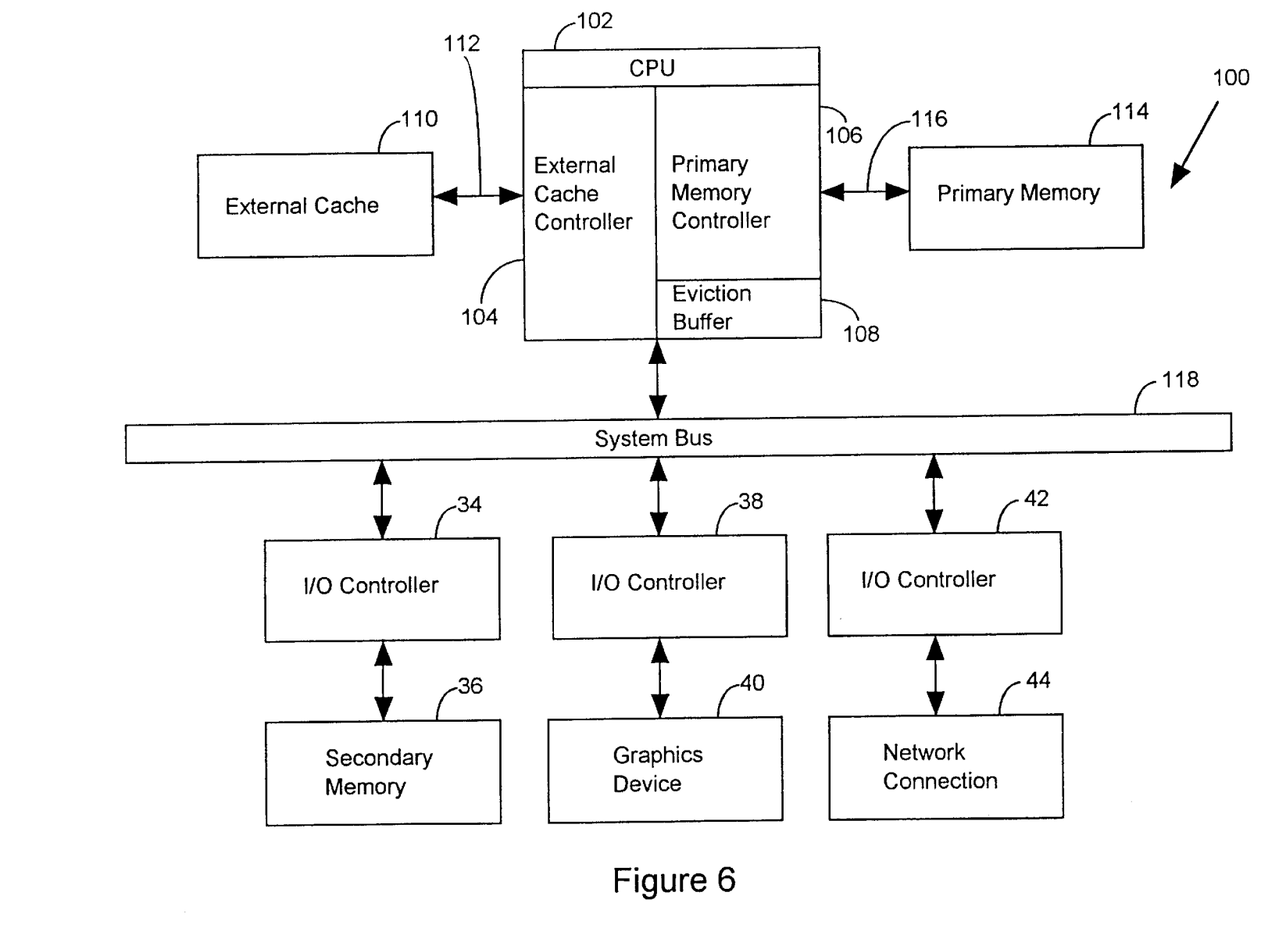
FIG. 6 illustrates a general purpose computer incorporating a central processing unit in accordance with the invention.

FIG. 6 illustrates a computer 100 constructed in accordance with one embodiment of the invention. The computer 100 includes a central processing unit (CPU) 102 with an external cache controller 104 and a primary memory controller 106. The primary memory controller 106 includes an eviction buffer 108.

The external cache controller 104 is connected to an external cache 110 via an external cache bus 112. Similarly, the primary memory controller 106 is connected to a primary memory 114 via a primary memory bus 116.

The first noteworthy aspect of the invention is that the CPU 102 has an on-board external cache controller 104 and primary memory controller 106. This topology is in contrast to the external cache controller 26 and primary memory controller 32 of FIG. 1. The close coupling of the external cache controller 104 and the primary memory controller 106 on the CPU 102 facilitates primary memory controller 106 optimizations in accordance with the invention. That is, the disclosed CPU topology allows for primary memory controller 106 improvements that do not add to traffic on the system bus 118, nor do they require dedicated signal lines into the CPU 102.

The remaining elements shown in FIG. 4 are consistent with those shown in FIG. 1. Thus, they will not be discussed further. Instead, attention turns to the operation of the CPU 102 of the invention.

Figure 7:
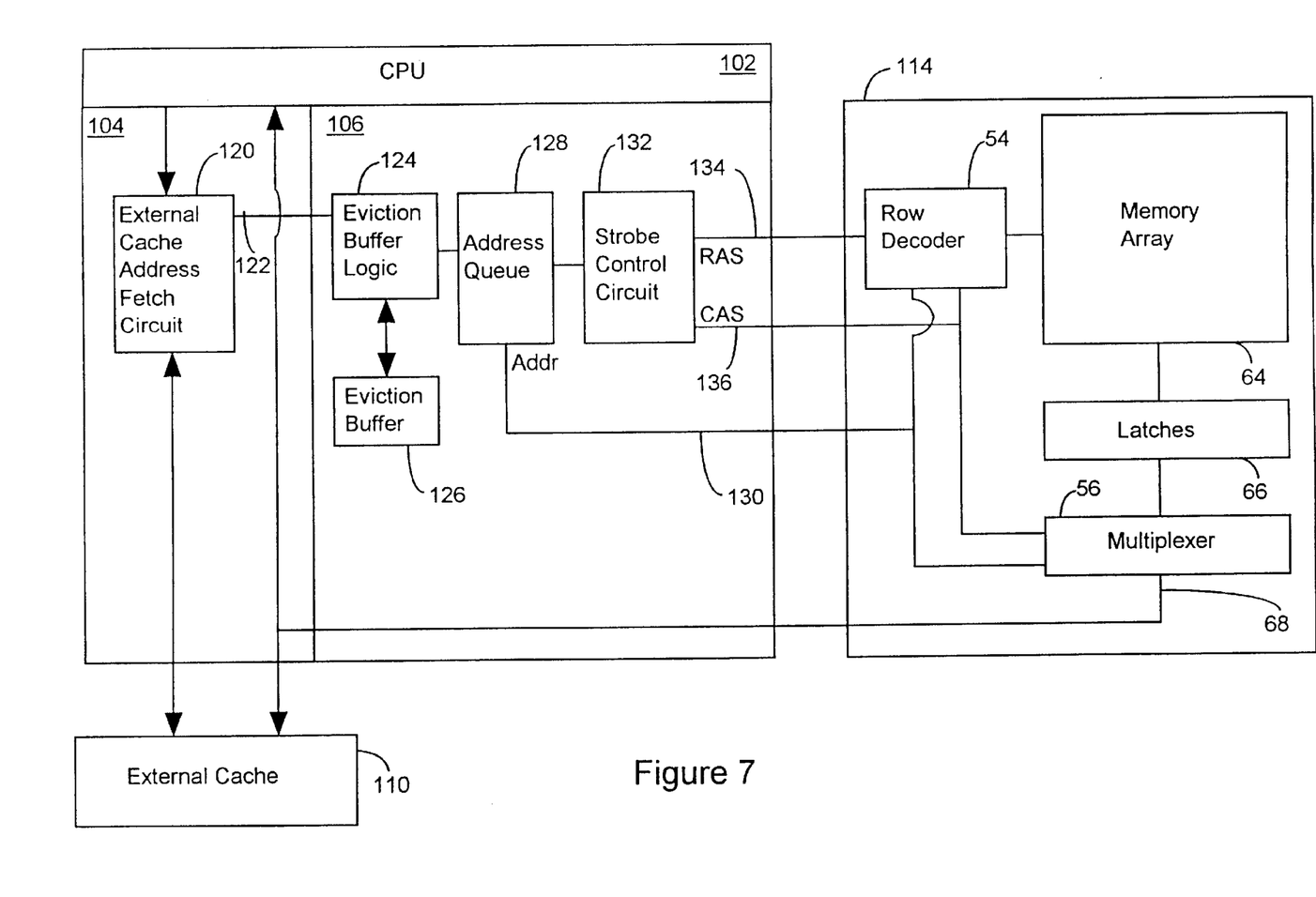
FIG. 7 illustrates a primary memory controller and primary memory in accordance with an embodiment of the invention.

FIG. 7 illustrates a CPU 102 including an on-board external cache controller 104 and primary memory controller 106 in accordance with an embodiment of the invention. The CPU 102 generates an address request that is applied to an external cache address fetch circuit 120 of the external cache controller 104. Consistent with prior art techniques, the address fetch circuit 120 queries the external cache 110 for the specified address request. If the specified address exists in the external cache 110, then it is routed to the CPU 102 for processing. If the specified address request does not exist in the external cache 110 (a cache miss), then an external cache miss signal and the specified address are passed to the primary memory controller 106. As indicated above, in some circumstance, the address request will be accompanied by a write request. That is, the primary memory controller will be required to read data from memory and write data to memory.

The request from the external cache controller 104 is received by an eviction buffer logic circuit 124. The eviction buffer logic circuit 124 of the invention is connected to an eviction buffer 126 and an address queue 128. The address queue 128, the output bus 130, the strobe control circuit 132, the output line 134, the output line 136, and the primary memory 114 operate in a manner that is consistent with the prior art device described in relation to FIG. 2. The present invention is directed toward the operation of the eviction buffer logic circuit 124 and the eviction buffer 126. These elements have an associated impact on the operation of the address queue 128 and corresponding primary memory accesses.

In short, the eviction buffer logic circuit 124 is used to identify primary memory write requests and then selectively store them and remove them from the eviction buffer 126. This operation is performed so that, whenever possible, primary memory read requests are loaded into the address queue 128 before primary memory write requests. In this way, the primary memory read requests are processed before the primary memory write requests to improve overall primary memory read request latencies. Primary memory read request latencies are much more critical to program execution than primary memory write back latencies.

Preferably, the eviction buffer 126 stores a single write back request. The eviction buffer 126 may store more, but it has been demonstrated that additional storage capacity does not provide linear performance improvements and that it results in substantive increases in system complexity.

In a preferable embodiment, the eviction buffer 124 stores a write back request in the eviction buffer 126, while passing a read request to the address queue 128. Further, the eviction buffer 124 identifies when the address queue 128 is empty. In response to an empty state, the eviction buffer logic circuit 124 moves a write back request of the eviction buffer 126 into the address queue 128. The eviction buffer logic circuit 124 also moves a write back request of the eviction buffer 126 into the address queue 128 when a new write back request is received at the eviction buffer logic circuit 124.

Figure 8:
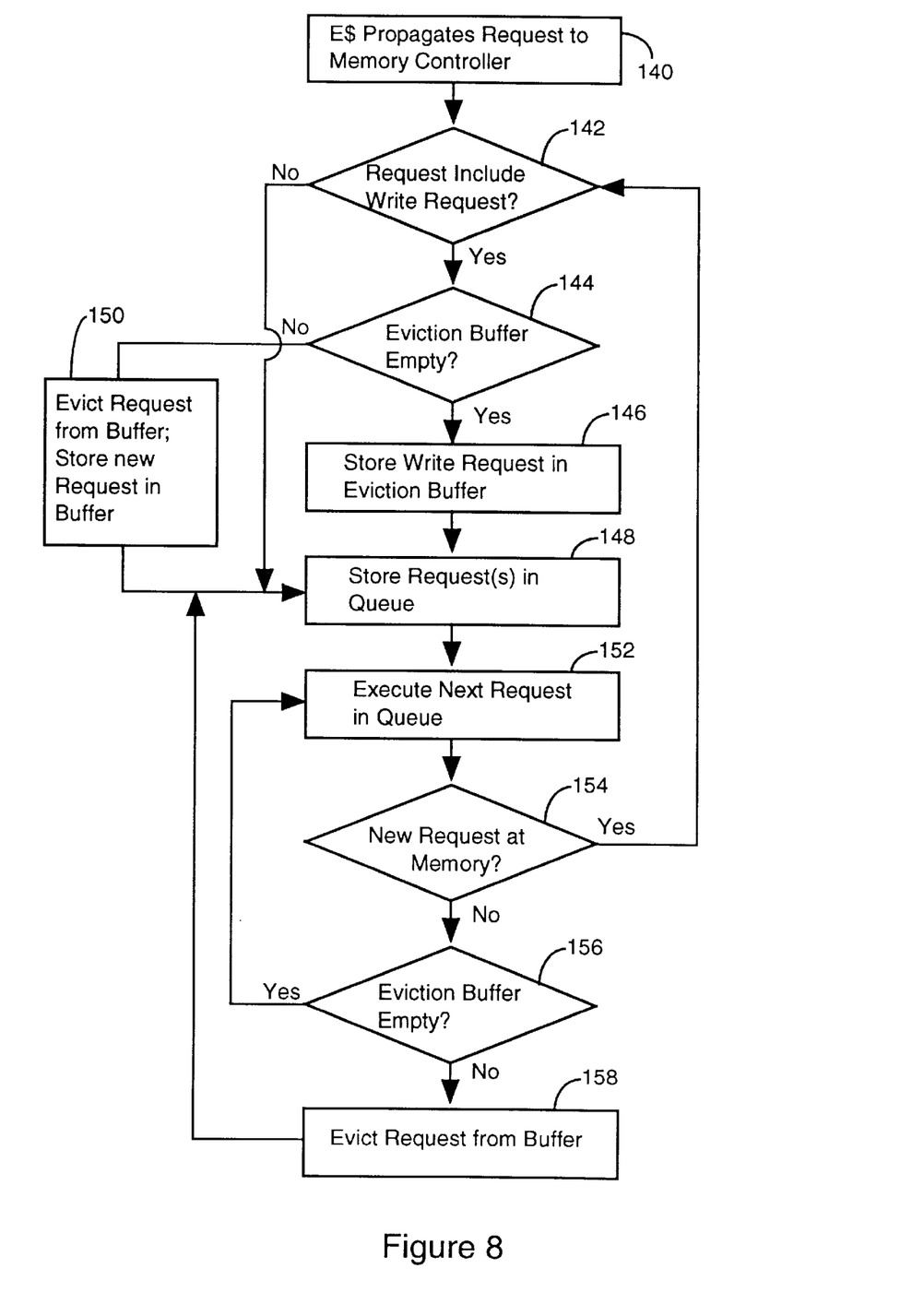
FIG. 8 illustrates eviction buffer processing steps in accordance with an embodiment of the invention.

The foregoing operations are more fully appreciated with reference to FIG. 8. The first processing step shown in FIG. 8 is that the external cache propagates a request to the primary memory controller (step 140). The eviction buffer 124 then determines whether the request includes a primary memory write request (step 142). If it does not, then the primary memory read request is loaded, by the eviction buffer logic circuit 124, into the address queue 128 (step 148). If a primary memory write request exists, then the eviction buffer logic circuit 124 assesses whether the eviction buffer 126 is empty (step 144). If the eviction buffer 126 is empty, then the new write request is stored in the eviction buffer (step 146). Thereafter, the read request associated with the stored write request is loaded into the queue 128 (step 148).

If the eviction buffer is not empty, as determined at step 144, then the existing write request in the eviction buffer is evicted and the new write request is loaded into the buffer (step 150). Thereafter, the eviction buffer logic circuit 124 stores the evicted write request in the address queue 128. It also stores the new read request in the address queue 128 (step 148).

The next processing step associated with the primary memory controller 106 is to execute the next request in the address queue 128 (step 152). Thereafter, a decision is made as to whether a new request has been received at the primary memory controller (step 154). If so, control returns to step 142. Note then that a new primary memory read request will be serviced before the write request in the eviction buffer is processed.

If a new request has not been received at the primary memory controller (step 154), a decision is made to determine whether the eviction buffer is empty (step 156). If the eviction buffer is empty, then processing returns to step 152. If the eviction buffer is not empty, then the write request in the eviction buffer is removed by the eviction buffer logic circuit (step 158) and is loaded into the request queue (step 148) for subsequent processing.

Figure 9:
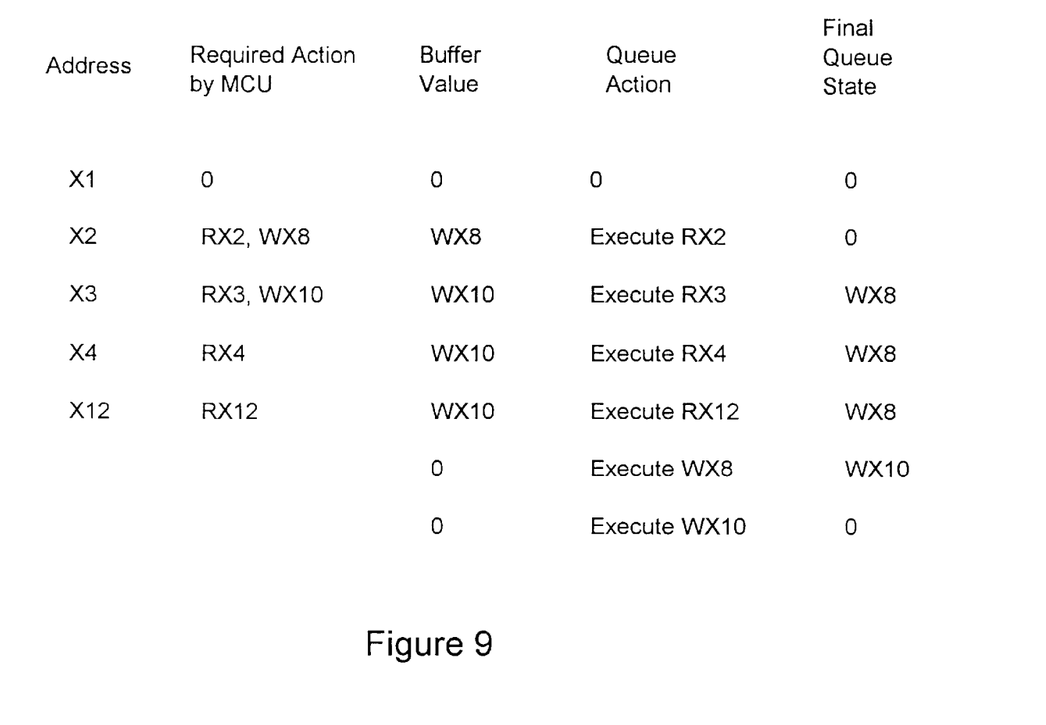
FIG. 9 illustrates different operations performed in processing the set of address requests of FIG. 4.

The processing of FIG. 8 is more fully appreciated with reference to FIG. 9. FIG. 9 illustrates the processing of the set of addresses shown in FIG. 4. The first address of the program 80 of FIG. 4 is X1. As illustrated in FIG. 4, the address X1 exists in the external cache 24. Thus, the CPU 22 retrieves the data associated with the X1 address and processes it. Consequently, no action is required by the primary memory controller 106, the eviction buffer 126 is still empty, no action is performed by the address queue 128, and the address queue 128 is in an empty state. This information is reflected in the first row of FIG. 9.

The address X2 is not found in the external cache 24. As indicated above, the external cache controller decides to store the X2 value at the location presently occupied by X8. Since the value of X8 has been changed, it must be written back to primary memory. Thus, as shown in FIG. 9, X2 must be read (RX2) from primary memory, while X8 must be written (WX8) to primary memory. This request at the primary memory controller 106 results in the eviction buffer logic circuit 124 storing the write request WX8 in the eviction buffer 126 (step 146 of FIG. 8). The read request RX2 is then loaded into the address queue 128 (step 148 of FIG. 8). The read request is then processed in the queue (step 152 of FIG. 8). As shown with the second row (second cycle) of FIG. 9, this results in an empty address queue 128.

The next address of the program 80 is X3. The address X3 is not found in the external cache 24. Thus, a primary memory read request is necessary to retrieve the value. In this case, the value X10 in the external cache must be written back to memory, since the dirty bit is set to a digital high value. Consequently, a read request (RX3) and a write request (WX10) are applied to the memory controller 106. Since the request includes a write request (see step 142 of FIG. 8), the value in the eviction buffer is replaced (step 150 of FIG. 8). Thereafter, the read request and evicted write request are placed in the address queue 128 (step 148 of FIG. 8). The read request RX3 is then processed. This cycle of processing is shown with the third row of FIG. 9.

The address X4 does not exist in the external cache 24. The value X4 can be loaded at the space occupied by the value X7 in the external cache 24, since the value of the dirty bit is a digital low. Thus, the primary memory controller 106 observes a read request (RX4). The new read request (RX4) is preferably loaded at the front of the address queue 128 (step 148 of FIG. 8). One of the requests is then processed, leaving the other request in the address queue, as shown with line 4 of FIG. 9.

The final address request in the program 80 is X12. The value X12 does not exist in the external cache 24. Thus, it must be retrieved. The retrieved value can be placed at the location currently occupied by X11. This operation can be performed without writing X11 back to primary memory. The read request RX12 is loaded into the address queue 128 by the eviction buffer logic 124. The address queue 128 already holds the value WX8 from the previous cycle. Preferably, RX12 is processed and WX8 remains in the queue, as shown with the fifth row of FIG. 9.

After RX12 is serviced, there are no more requests at the memory controller 106. Therefore, the eviction buffer is checked (step 156 of FIG. 8). Since the eviction buffer is not empty, the value in the buffer is stored in the address queue (steps 158 and 148 of FIG. 8). Thereafter, the next value in the address queue (WX8) is executed, leaving WX10, the value evicted from the eviction buffer, in the address queue 128. The final value in the address queue 128 is then processed, as shown with the last line of FIG. 9.

Figure 10:
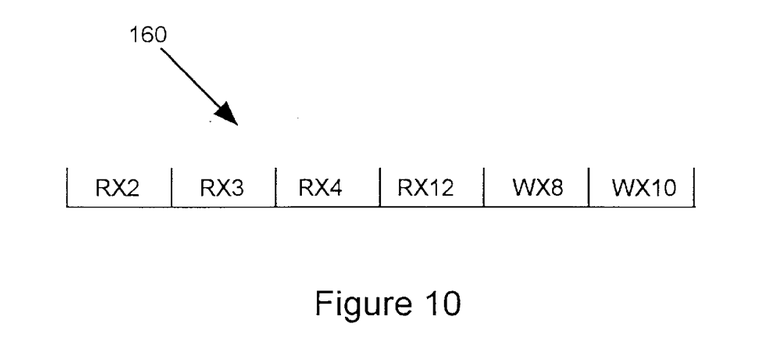
FIG. 10 illustrates the sequence of processing performed at the memory control unit when the address requests of FIG. 4 are processed.

FIG. 10 illustrates the sequence of processing executed in the foregoing example. This figure should be contrasted to the processing shown in FIG. 5. Note that with the present invention, each primary memory read value is processed earlier. This simple example demonstrates the improvement in primary memory read latencies achieved by prioritizing primary memory reads over primary memory writes, in accordance with the invention.

FIG. 10 also illustrates how primary memory page-mode optimizations can be increased in accordance with the invention. Note that the first two addresses to be read (X2 and X3) appear on the same memory page 84A. Consequently, these values can be retrieved using page-mode optimizations. That is, the same row address can be maintained while multiple words are retrieved on the page. This avoids the time overhead of asserting new row addresses and RAS signals. Note in FIG. 5 that the write operation (WX10) interposed between the reading of values X2 and X3 destroys the opportunity for a page-mode optimization. In the processing of FIG. 5, the first memory page 84A must be accessed (to read X2), followed by the fourth memory page 84C (to write X10), followed by the first memory page 84A (to read X3).

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A central processing unit of a computer, comprising:
    an external cache controller to selectively generate a primary memory read request and a primary memory write request; and
    a primary memory controller including
        an address queue,
        an eviction buffer, and
        an eviction buffer logic circuit connected between said external cache controller, said address queue, and said eviction buffer, said eviction buffer logic circuit selectively storing said primary memory write request in said eviction buffer and storing said primary memory read request in said address queue, wherein said eviction buffer logic circuit responds to a new primary memory write request by evicting a primary memory write request from said eviction buffer and routing it to said address queue.

2. The apparatus of claim 1 wherein said eviction buffer is configured to store a single primary memory write request.

3. The apparatus of claim 1 wherein said eviction buffer logic circuit routes a primary memory write request from said eviction buffer to said address queue when said address queue is empty.

4. The apparatus of claim 1 wherein said eviction buffer logic circuit routes a primary memory write request of said eviction buffer to said external cache controller in response to a primary memory read request.

5. The apparatus of claim 1 wherein said primary memory controller includes a strobe control circuit connected to said address queue.

6. The apparatus of claim 1 further comprising a primary memory connected to said primary memory controller.

7. The apparatus of claim 1 further comprising an external cache connected to said external cache controller.

8. The apparatus of claim 1 further comprising a system bus connected to said central processing unit.

9. The apparatus of claim 8 further comprising a plurality of input/output controllers connected to said system bus.

10. A method of processing data in a computer, said method comprising the steps of:
    generating a first primary memory read request and a first primary memory write request in response to an external cache miss;
    storing said first primary memory write request in an eviction buffer, wherein said storing step includes the step of evicting a previous primary memory write request from said eviction buffer;
    positioning said primary memory read request in a memory queue;
    placing said previous primary memory write request in said memory queue; and
    executing the next memory request in said memory queue.

11. The method of claim 10 further comprising the step of processing said first primary memory write request when said memory queue is empty.

12. The method of claim 10 further comprising the step of routing said first primary memory write request to external cache in response to a primary memory read request.

* * * * *